United States Patent
Garrett et al.

(10) Patent No.: US 9,564,956 B2
(45) Date of Patent: Feb. 7, 2017

(54) CHANNEL ESTIMATION USING A MULTI-USER FRAME

(71) Applicant: Broadcom Corporation, Irvine, CA (US)

(72) Inventors: David Garrett, Tustin, CA (US); Nihar Jindal, Mountain View, CA (US); Jun Zheng, San Diego, CA (US); Srinath Puducheri Sundaravaradhan, Sunnyvale, CA (US)

(73) Assignee: BROADCOM CORPORATION, Irvine, CA (US)

( * ) Notice: Subject to any disclaimer, the term of this patent is extended or adjusted under 35 U.S.C. 154(b) by 277 days.

(21) Appl. No.: 14/270,975

(22) Filed: May 6, 2014

(65) Prior Publication Data

US 2015/0236770 A1    Aug. 20, 2015

Related U.S. Application Data

(60) Provisional application No. 61/941,298, filed on Feb. 18, 2014.

(51) Int. Cl.
*H04B 7/06*    (2006.01)
*H04B 7/04*    (2006.01)
*H04L 25/02*    (2006.01)

(52) U.S. Cl.
CPC .......... *H04B 7/0617* (2013.01); *H04B 7/0452* (2013.01); *H04L 25/0204* (2013.01); *H04B 7/0619* (2013.01)

(58) Field of Classification Search
CPC ....... H04B 7/0486; H04B 7/06; H04B 7/0617; H04B 7/216
See application file for complete search history.

(56) References Cited

U.S. PATENT DOCUMENTS

2007/0195811 A1*  8/2007  Basson ................. H04L 1/0026
                                                    370/441
2015/0071185 A1*  3/2015  Trainin ................ H04B 7/0617
                                                    370/329

* cited by examiner

*Primary Examiner* — Andrew Lai
*Assistant Examiner* — Leon Andrews
(74) *Attorney, Agent, or Firm* — Foley & Lardner LLP

(57) ABSTRACT

A systems and method of channel estimation can be used in wireless environments. The systems and method can: (a) determine, by a transmitter, a number of receivers with which to communicate wirelessly, the number of receivers being at least one and corresponding to at least a first receiver; and (b) generate, by the transmitter, a frame to transmit to the first receiver, the frame generated based on a total number of receivers that is higher than the determined number of receivers.

20 Claims, 7 Drawing Sheets

CHANNEL ESTIMATION USING A MULTI-USER FRAME

CROSS REFERENCE TO RELATED APPLICATIONS

This application claims the benefit of and priority to U.S. Application Ser. No. 61/941,298, filed Feb. 18, 2014, entitled "METHODS AND SYSTEMS FOR IMPROVING CHANNEL ESTIMATION USING A MULTI-USER FRAME", assigned to the assignee of this application, and which is incorporated herein by reference in its entirety for all purposes.

FIELD OF THE DISCLOSURE

This disclosure generally relates to systems and methods for improving channel estimations in communication systems. In particular, this disclosure relates to systems and methods for improving channel estimation using a multi-user frame or packet.

BACKGROUND OF THE DISCLOSURE

In the last few decades, the market for wireless communications devices has grown by orders of magnitude, fueled by the use of portable devices, and increased connectivity and data transfer between all manners of devices. Digital switching techniques have facilitated the large scale deployment of affordable, easy-to-use wireless communication networks. Furthermore, digital and radio frequency (RF) circuit fabrication improvements, as well as advances in circuit integration and other aspects have made wireless equipment smaller, cheaper, and more reliable. Wireless communication can operate in accordance with various standards such as IEEE 802.11x, Bluetooth, global system for mobile communications (GSM), code division multiple access (CDMA). As higher data throughput and other changes develop, newer standards are constantly being developed for adoption, such as a progression from IEEE 802.11n to IEEE 802.11ac.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION OF EMBODIMENTS

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure can reference aspects of these standard(s), the disclosure is in no way limited by these standard(s).

For purposes of reading the description of the various embodiments below, the following descriptions of the sections of the specification and their respective contents can be helpful: Section A describes a network environment and computing environment which can be useful for practicing embodiments described herein; and Section B describes embodiments of systems and methods for improving signal-to-noise ratio and/or channel estimation. Embodiments of the system and methods can utilize a multi-user-multiple-input and multiple-output (MU-MIMO) frames to provide extra training fields to increase the integrity of the channel estimation, thereby increasing the signal-to-noise ratio (SNR).

A. Computing and Network Environment

Figure 1A:
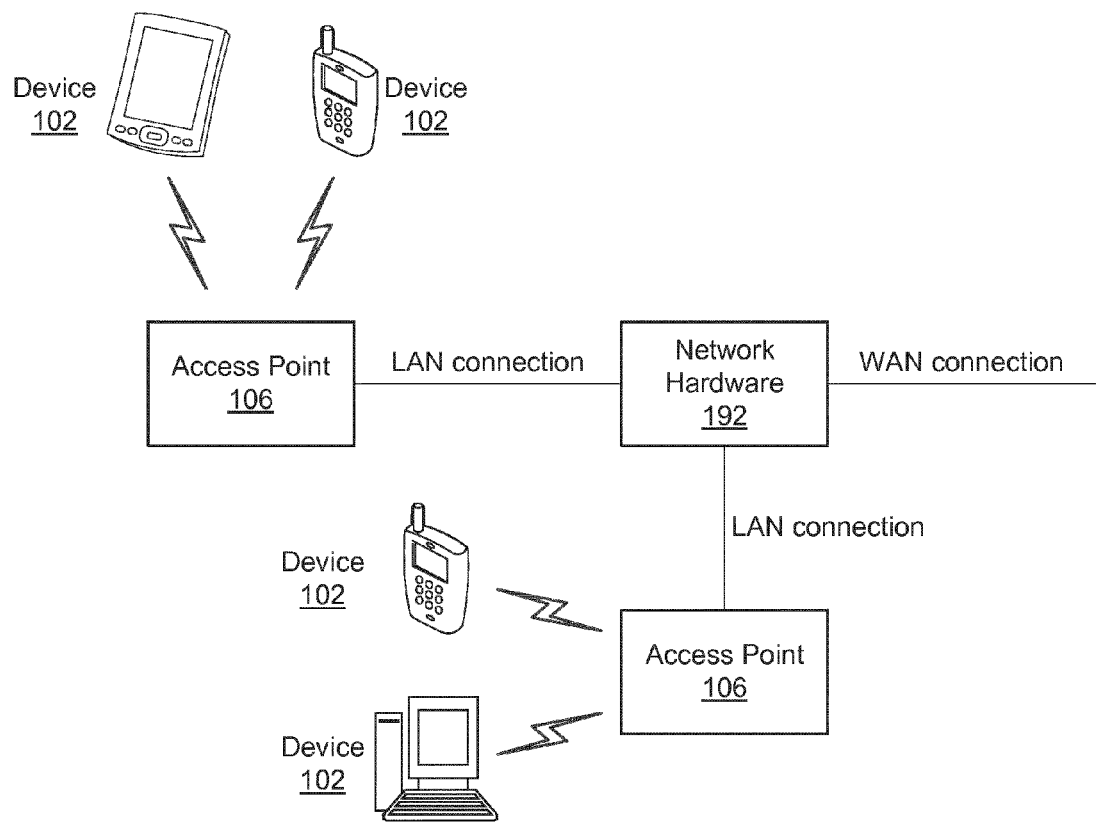
FIG. 1A is a block diagram depicting an embodiment of a network environment including one or more access points in communication with one or more devices or stations.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102 and/or cellular telephone devices 102. The details of an embodiment of each wireless communication device and/or access point are described in greater detail with reference to FIGS. 1B and 1C. The network environment can be an ad hoc network environment, an infrastructure wireless network environment, a subnet environment, etc., in one embodiment.

The APs 106 can be operably coupled to the network hardware 192 via local area network connections. The network hardware 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices can register with a particular AP 106 to receive services from the communication system (e.g., via a SU-MIMO or MU-MIMO configuration). For direct connections (i.e., point-to-point communications), some wireless communication devices can communicate directly via an allocated channel and communications protocol. Some of the wireless communication devices 102 can be mobile or relatively static with respect to the AP 106.

In some embodiments an AP 106 includes a device or module (including a combination of hardware and software) that allows wireless communication devices 102 to connect to a wired network using Wi-Fi, or other standards. An AP 106 can sometimes be referred to as a wireless access point (WAP). An AP 106 can be configured, designed and/or built for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provides wireless connections using radio frequency links for other devices 102 to utilize that wired connection. An AP 106 can be built and/or designed to support a standard for sending and receiving data using one or more radio frequencies. Those standards, and the frequencies they use can be defined by the IEEE (e.g., IEEE 802.11 standards). An AP 106 can be configured and/or used to support public Internet hotspots, and/or on an internal network to extend the network's Wi-Fi signal range.

In some embodiments, the access points 106 can be used for in-home or in-building wireless networks (e.g., IEEE 802.11, Bluetooth, ZigBee, any other type of radio frequency based network protocol and/or variations thereof). Each of the wireless communication devices 102 can include a built-in radio and/or is coupled to a radio. Such wireless communication devices 102 and/or access points 106 can operate in accordance with the various aspects of the disclosure as presented herein to enhance performance, reduce costs and/or size, and/or enhance broadband applications. Each wireless communication devices 102 can have the capacity to function as a client node seeking access to resources (e.g., data, and connection to networked nodes such as servers) via one or more access points.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
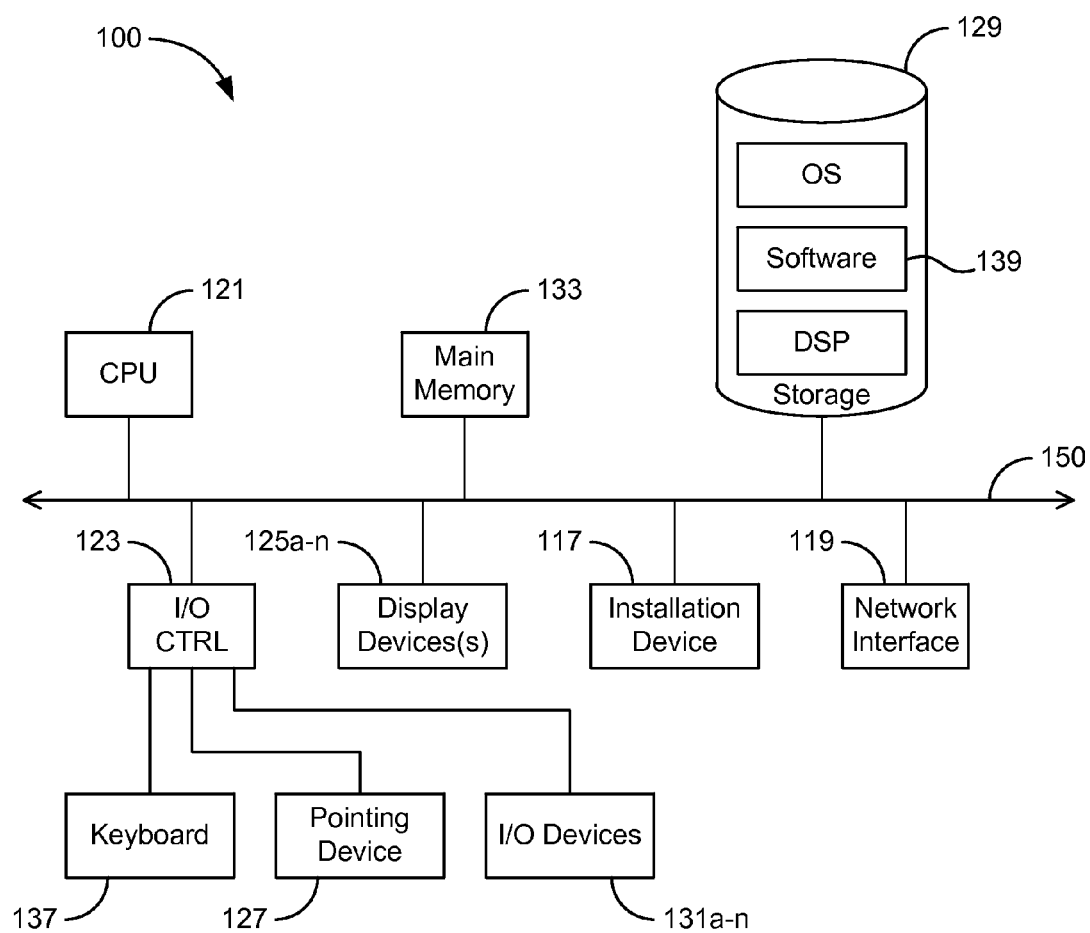
FIGS. 1B and 1C are block diagrams depicting embodiments of computing devices useful in connection with the methods and systems described herein.
Figure 1C:
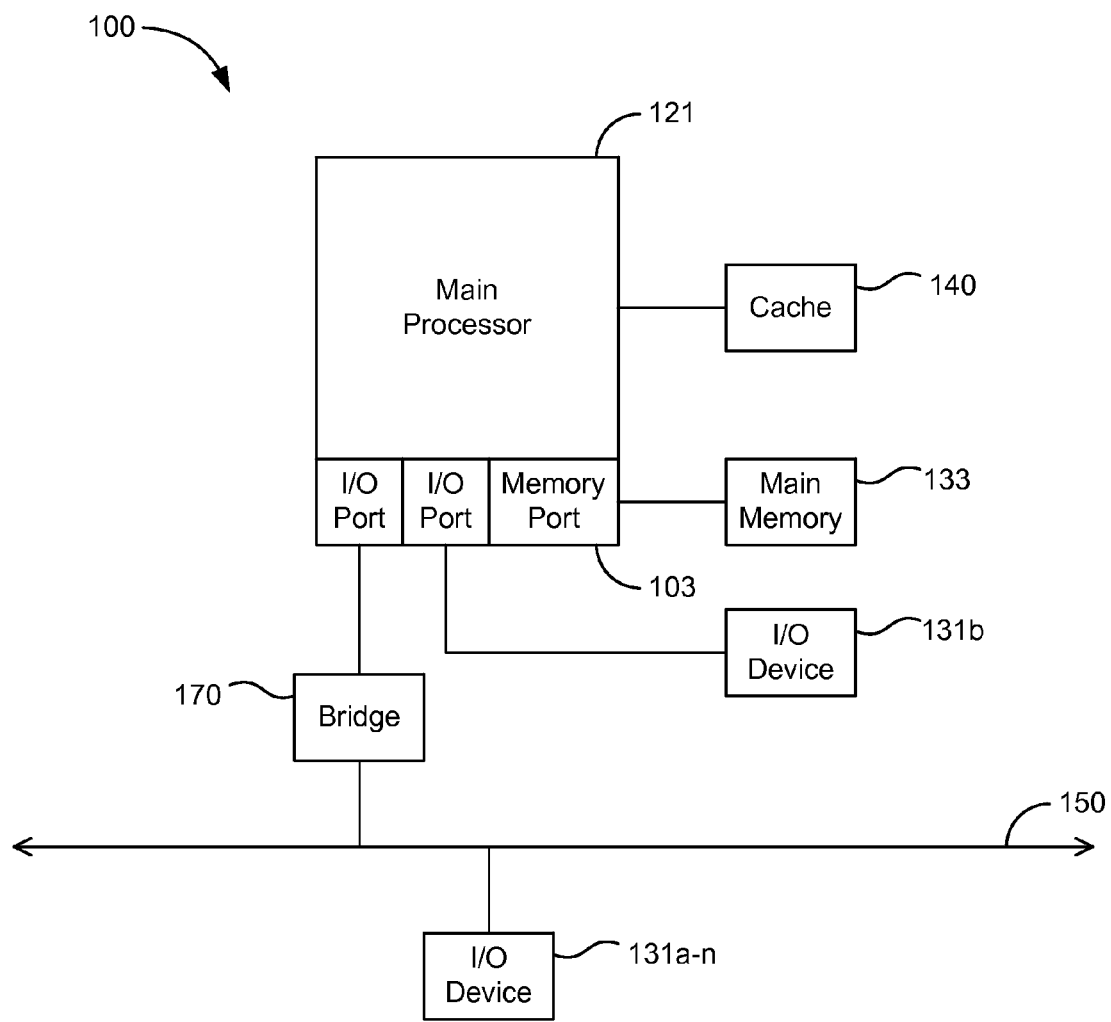

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication device 102 or AP 106. As shown in FIGS. 1B and 1C, each computing device 100 includes a central processing unit 121, and a main memory unit 133. As shown in FIG. 1B, a computing device 100 can include a storage device 128, an installation device 117, a network interface 119, an I/O controller 123, display devices 125*a*-125*n*, a keyboard 137 and a pointing device 127, such as a mouse. The storage device 129 can include, without limitation, an operating system and/or software. As shown in FIG. 1C, each computing device 100 can also include additional optional elements, such as a memory port 103, a bridge 170, one or more input/output devices 131*a*-131*n* (generally referred to using reference numeral 131), and a cache memory 140 in communication with the central processing unit 121.

The central processing unit 121 is any logic circuitry that responds to and processes instructions fetched from the main memory unit 133. In many embodiments, the central processing unit 121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 can be based on any of these processors, or any other processor capable of operating as described herein.

Main memory unit 133 can be one or more memory chips capable of storing data and allowing any storage location to be directly accessed by the microprocessor 121, such as any type or variant of Static random access memory (SRAM), Dynamic random access memory (DRAM), Ferroelectric RAM (FRAM), NAND Flash, NOR Flash and Solid State Drives (SSD). The main memory 133 can be based on any of the above described memory chips, or any other available memory chips capable of operating as described herein. In the embodiment shown in FIG. 1B, the processor 121 communicates with main memory 133 via a system bus 150 (described in more detail below). FIG. 1C depicts an embodiment of a computing device 100 in which the processor communicates directly with main memory 133 via a memory port 103. For example, in FIG. 1C the main memory 133 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 133 and is provided by, for example, SRAM, BSRAM, or EDRAM. In the embodiment shown in FIG. 1C, the processor 121 communicates with various I/O devices 131 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 125, the processor 121 can use an Advanced Graphics Port (AGP) to communicate with the display 124. FIG. 1C depicts an embodiment of a computer 100 in which the main processor 121 can communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 131*a*-131*n* can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium 117 for the computing device 100. In still other embodiments, the computing device 100 can provide USB connections (not shown) to receive handheld USB storage devices such as the USB Flash Drive line of devices manufactured by Twintech Industry, Inc. of Los Alamitos, Calif.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 139 for implementing (e.g., software 139 configured and/or designed for) the systems and methods described herein. Optionally, any of the installation devices 117 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11 ad, CDMA, GSM, WiMax and direct asynchronous connections). In one embodiment, the computing device 100 communicates with other computing devices 100 via any type and/or form of gateway or tunneling protocol such as Secure Socket Layer (SSL) or Transport Layer Security (TLS). The network interface 119 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 125a-125n. As such, any of the I/O devices 131a-131n and/or the I/O controller 123 can include any type and/or form of suitable hardware, software, or combination of hardware and software to support, enable or provide for the connection and use of the display device(s) 125a-125n by the computing device 100. For example, the computing device 100 can include any type and/or form of video adapter, video card, driver, and/or library to interface, communicate, connect or otherwise use the display device(s) 125a-125n. In one embodiment, a video adapter can include multiple connectors to interface to the display device(s) 125a-125n. In other embodiments, the computing device 100 can include multiple video adapters, with each video adapter connected to the display device(s) 125a-125n. In some embodiments, any portion of the operating system of the computing device 100 can be configured for using multiple displays 125a-125n. One ordinarily skilled in the art will recognize and appreciate the various ways and embodiments that a computing device 100 can include or support one or more display devices 125a-125n.

In further embodiments, an I/O device 131b can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein.

In some embodiments, the computing device 100 can have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Improving Channel Estimation or SNR Capacity Using an MU-MIMO Frame

Described herein with reference to FIGS. 2A-C and 3 are systems and methods for improving the channel estimation and/or signal-to-noise ratio between a beamformer, such as the access point (AP) 106, and a beamformee, such as at least one wireless communication device 102 (e.g. user or station (STA)), using a multi-user (MU) frame 112 (e.g., an MU-MIMO frame in some embodiments) according to certain embodiments. In one embodiment, the beamformee can communicate the multi-user frame 112 to one or more beamformees in one embodiment. In one embodiment, the one or more beamformees (e.g., wireless communication device 102), each have multi-user communication capability.

With N number of wireless communication devices 102, the AP 106 can have certain amounts of data to send to each of the N devices 102. For example, the AP 106 can have first bits to send to a first device 102 on a first spatial stream, and second bits to send to a second device 102 on a second spatial stream, etc. The first and second bits are each sent in a data field 128 in the frame 112.

In an embodiment using an MU-MIMO frame as the frame 112, the frame 112 includes a legacy short training field (L-STF) 114, a legacy long training field (L-LTF) 116, a legacy signal frame (L-SIG) 118, a very high throughput signal A field (VHT-SIG-A) 120, a very high throughput short training field (VHT-STF) 122, a very high throughput long training field (VHT-LTF-1) 124, a very high throughput SIG-B field (VHT-SIG) 130 and the data field 128 according to one embodiment. The MU-MIMO frame 112 can include additional VHT-LTF fields from 1 to N depending upon the number of beamformee devices, such as, wireless communication device 102 that will receive the frame 112. In one embodiment, a second very high throughput—long training field (VHT-LTF-2) 130 can be provided. The data field 128 can be unique for each wireless communication device 102 which is receiving the frame 112. The frame 112 can be formed according to various MU protocols or standards in certain embodiments.

Embodiments of the system and methods described herein can improve channel estimation by providing the frame 112 with multiple copies of the field 124. In one embodiment, the copies of the field 124 are exact duplicates. In one embodiment, the copies of the field 124 are not exact duplicates. In one embodiment, the copies of the field 124 are sign-modulated copies. In one embodiment, the copy of the field 124 is a negative of the field 124. In certain embodiments, multiple copies of other training fields can be utilized. In one embodiment, the field 126 is a copy of the field 124 (e.g., a sign modulated copy in one embodiment). In one embodiment, the number of copies is chosen based upon the number of wireless communication devices 102 (e.g., users or STAs) in the environment capable of MU communication. In one embodiment, the number of copies of the field 124 is chosen to be more than the number of the wireless communication device 102 capable of MU communication receiving the frame 112. The copies of field 124 can be provided in a pattern for sign modulation; the pattern can be known to the receiver (e.g., can be hard coded in device 102) and can be in accordance with an 802.11ac standard. In one embodiment, where two streams are used, a first stream uses a first pattern of plus and minus copies and a second stream uses a second pattern of plus and minus copies.

The fields 124 and 126 are used for channel estimation in one embodiment. The use of multiple copies of the field 124 in the frame 112 (which is transmitted by AP 106 in one embodiment) allows for noise averaging over the multiple copies of the field 124. Noise averaging improves channel estimation which in turn improves the effective SNR of the channel for the wireless communication device 102 in one embodiment. The improved channel estimation and/or SNR can be used to increase modulation and coding scheme (MCS) levels for faster communication in one embodiment.

Figure 2A:
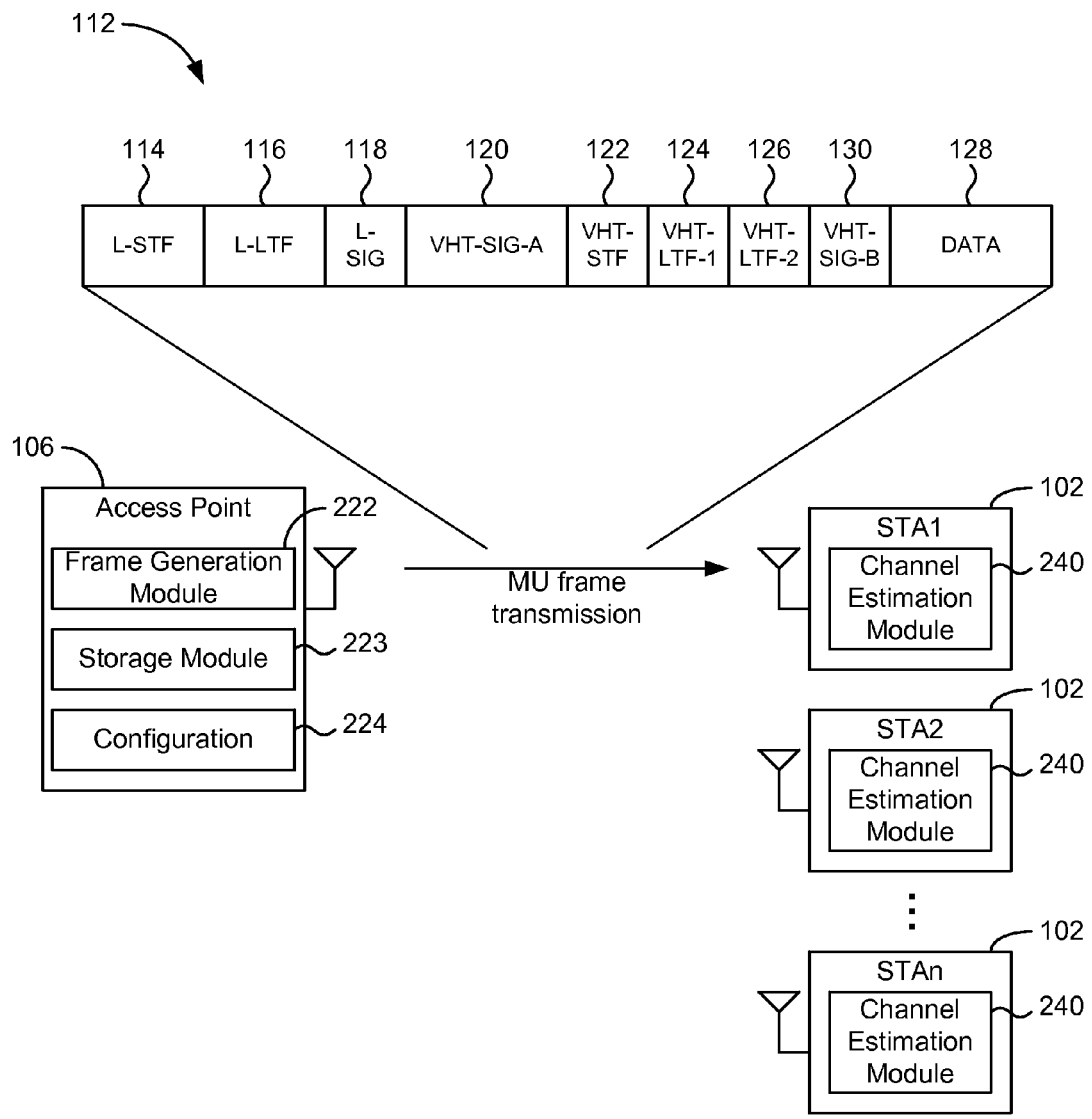
FIG. 2A is a block diagram depicting one embodiment of a system for communicating a multi-user frame.

In the embodiment shown in FIG. 2A with frame 112 being provided to a single user or wireless communication device 102, the transmitter or AP 106 constructs the frame 112 for a number of users that is more than the actual number of MU capable devices 102 receiving the frame 112. The frame 112 can be constructed for more than the number of MU capable devices receiving the frame 112 by generating additional copies of field 124 in one embodiment. In FIG. 2A, the field 126 is a copy of the field 124 (e.g., a sign modulated copy in one embodiment) and there are more copies of the field 124 than the number of wireless communication devices 102 receiving frame 112 according to one embodiment.

In a multiple user embodiment of the environment, the transmitter or AP 106 can construct the frame 112 such that additional copies of the field 124 are provided to outnumber the number of devices 102 receiving the frame 112 (e.g., three, four, . . . N copies of the field 124 in a two-user environment). In one embodiment where two wireless devices 102 receive the frame 112, a copy of the field 124 (e.g., a sign modulated copy in one embodiment) and a copy of the field 126 (e.g., a sign modulated copy in one embodiment) can be provided in the frame 112. In another embodiment, two or more copies of each of the fields 124 and 126 can be provided.

As there is no requirement to allocate power for transmissions to phantom users that are not actually present in some embodiments, the system and method provide improved channel estimation at wireless communication device 102 of the frame 112 at the expense of a few additional orthogonal frequency-division multiplexing (OFDM) symbols according to one embodiment using 802.11 standards. The additional copies of the field 124 can also be used to provide more accurate estimation of time of flight at device 102 and improve WLAN location capability in one embodiment. In one embodiment, device 102 can more accurately determine the time of arrival of the first channel tap using copies of the field 124.

The multiple copies of the field 124 can be used for noise averaging over multiple copies at the wireless communication device 102 in one embodiment. The number of copies of field 124 depends on a number of users in an embodiment using, for example, an 802.11ac standard or other MU standard The numbers of copies of field 124 can be increased by specifying more users than is actually present in the MIMO environment in one embodiment. The wireless communication device 102 can operate according to the 802.11ac standard without modification and still take advantage of the multiple copies of the field 124 in one embodiment. A new protocol for the wireless device 102 or a reconfiguration of the wireless device 102 is not necessary to achieve improved performance in one embodiment.

In some embodiments, the disclosure is directed to a method of channel estimation. The method includes determining, by a transmitter, a number of receivers with which to communicate a frame wirelessly. The number of receivers is at least one and corresponds to at least a first receiver. The method also includes generating, by the transmitter, a frame to transmit to the first receiver. The frame is generated based on a total number of receivers that is higher than the determined number of receivers.

In another embodiment, the present disclosure is directed to a wireless beamformer device. The wireless beamformer device includes a processor that can provide a frame to transmit to at least a first wireless beamformee device. The frame is generated based on a total number of beamformee devices that is higher than a total number of intended recipients. The processor has data indicating that the first wireless beamformee device supports multiple user beamforming.

In some embodiments, the present disclosure is directed to a method of wireless communication. The method includes determining, by a beamformer, a number of beamformees supporting multiple unit beamforming and providing, by the beamformer, a frame to transmit. The frame includes a number of fields for multiple unit beamforming training, the number of fields for multiple unit beamforming training being more than a total number of beamformees intended to receive the frame.

Referring to FIG. 2A, the AP 106 can include a frame generation module 222, a storage module 223 and/or a configuration 224 in one embodiment. The wireless communication device 102 includes a channel estimation module 240 in one embodiment.

The AP 106 and/or the wireless communication device 102 can each include a radio, and can include a transmitter and/or a receiver. The AP 106 can include a beamformer, and can include one or more antennas (e.g., phase array antennas). The system can support a MU-MIMO transmission configuration between the AP 106 and the multiple wireless communication devices 102. At least one wireless communication device 102 has multi-user communication capabilities (e.g., MU-MIMO capabilities) in one embodiment. The AP 106 can use beamforming to transmit to each wireless communication device 102 the frame 112 with a unique payload or data field 128 for each wireless communication device 102.

The AP 106 can determine which wireless communication devices 102 in the environment have multi-user communication capabilities in one embodiment. The AP 106 can survey devices 102 for multi-user capabilities based upon using sounding frames and can store such capabilities for each device 102 in the storage module 223.

For the devices 102 that have multi-user communication capabilities, the AP 106 provides the frame 112 with additional copies of field 124 (e.g., more copies than the number of wireless communication devices 102 with multi-user communication (e.g., MU-MIMO) capability). The number of copies can be up to the number that wireless communication device 102 can handle based upon the wireless communication device's MU communication capabilities in one embodiment. Such capabilities can be stored in module 223 of AP 106. The wireless communication device 102 receives frame 112 and uses the additional copies of field 124 (the additional copy can include field 126) to provide a channel estimation by a channel estimation module 240. The use of additional fields 124 and 130 allows the channel estimation module 240 of the wireless communication device 102 to average training information without interference in some embodiments, thereby providing an improved channel and signal-to-noise ratio at wireless communication device 102 in certain embodiments. Additional energy for the transmission of the frame 112 is not necessary in one embodiment.

The channel estimation can be utilized to provide a channel estimation error and transmit a channel estimation response to the AP 106. Channel estimation error reduces the post-slicer SNR at the receiver (wireless communication device 102). Noise averaging over multiple copies of field 124 allows a channel estimation error to be reduced in some embodiments. The signal in the multiple copies of field 124 is additive while the noise introduced (e.g., during transmission) is not in one embodiment.

In addition, smoothing can be used to exploit the correlation of the channel on neighboring sub-carriers to improve the channel estimation quality according to one embodiment. In addition, wireless communication device 102 can use the multiple copies of field 124 for WLAN location capability according to one embodiment. Copies of the field 124 and field 126 can provide the opportunity for wireless communication device 102 to very accurately determine the time of arrival of the first channel tap and therefore can be used to improve time of flight estimation at a wireless communication device 102.

In one embodiment, the AP 106 can provide a four stream MU-MIMO frame format to transmit a single stream to a single wireless communication device 102. Signaling bits in the VHT-SIG-B frame 118 can indicate that the frame 112 has a total of four streams, one of which is for the actual intended user (e.g., device 102) while the other three streams are fake and contain no data and no power in one embodiment.

In one embodiment, only the column of the MU-MIMO steering matrix corresponding to the actual intended user or device 102 is non-zero. The other three columns of the matrix are filled with zeros. Frame generation module 212 can provide the appropriate steering matrices for the AP 106. In this embodiment, the frame 112 includes four copies of field 124 due to the four total streams which allows four times noise averaging and reduces channel estimation error by a factor of four. This leads to a 2 dB advantage relative to using single stream, single unit (SU) transmission at a cost of three additional symbols which is negligible for long frames according to one embodiment. The use of fake streams is transparent to the intended wireless communication device 102 which operates as though a normal 4-stream MU frame is provided.

The wireless communication device 102 can perform smoothing after long training field (e.g., field 124) averaging for additional signal-to-noise ratio gain. In another embodiment, the AP 106 provides two stream transmission using a 4-stream MU format with 2 fake streams and 2 streams for two intended users or wireless communication device 102. In this embodiment, the wireless communication devices 102 each can receive two fields 124 and two fields 126 instead of a single field 124 and a single field 126.

Figure 2B:
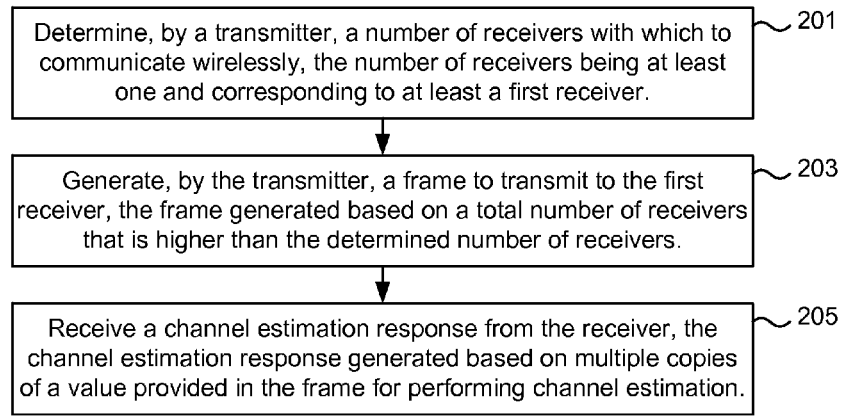
FIG. 2B is a flow diagram illustrating one embodiment of a method of transmitting a multi-user frame.

With reference to FIG. 2B, an example of an embodiment of a procedure or routine for transmitting a frame is depicted. The routine can be used when a transmitter (e.g., the AP 106) has decided to send data to a first receiver (e.g., one of the devices 102. The routine includes determining, by the AP 106, a number of devices 102 with which to communicate wirelessly at an operation 201. The number of devices 102 (e.g., STAs) is at least one and corresponds to at least a first receiver. The AP 106 can use the configuration 224, storage module 223 and frame generation module 222 to determine the number of receivers (e.g., devices 102) that are capable of multi-unit communication, such as MU-MIMO communication in one embodiment. The acquisition process can be used to determine the number of MU-MIMO capable wireless communication device 102 in one embodiment. The AP 106 can store or otherwise access data indicative of the MU capability of the device in one embodiment.

The AP 106 can generate the frame 112 to transmit to the receivers (e.g., devices 102) based upon a total number of receivers that is higher than the determined number of receivers at an operation 203 in one embodiment. At an operation 205, AP 106 can utilize fields (e.g., the fields 124 and 126) associated with the frame 112 generated at operation 203 to determine a channel estimation via module 240. The channel estimate can be an internal variable (e.g., inside the receiver or device 102) that the device 102 uses to demodulate/decode the frame 112.

In one embodiment, the AP 106 can use a sounding frame protocol using multiple copies of the field 124 according to an 802.11ac or other protocol. The AP 106 can send a null data packet or NDP with the purpose of allowing the beamformee (e.g., device 102) to estimate the channel estimate. The device 102 can feedback this estimate to the AP 106. Multiple copies of the LTF field can be provided in the sounding frame to improve channel estimation.

Figure 2C:
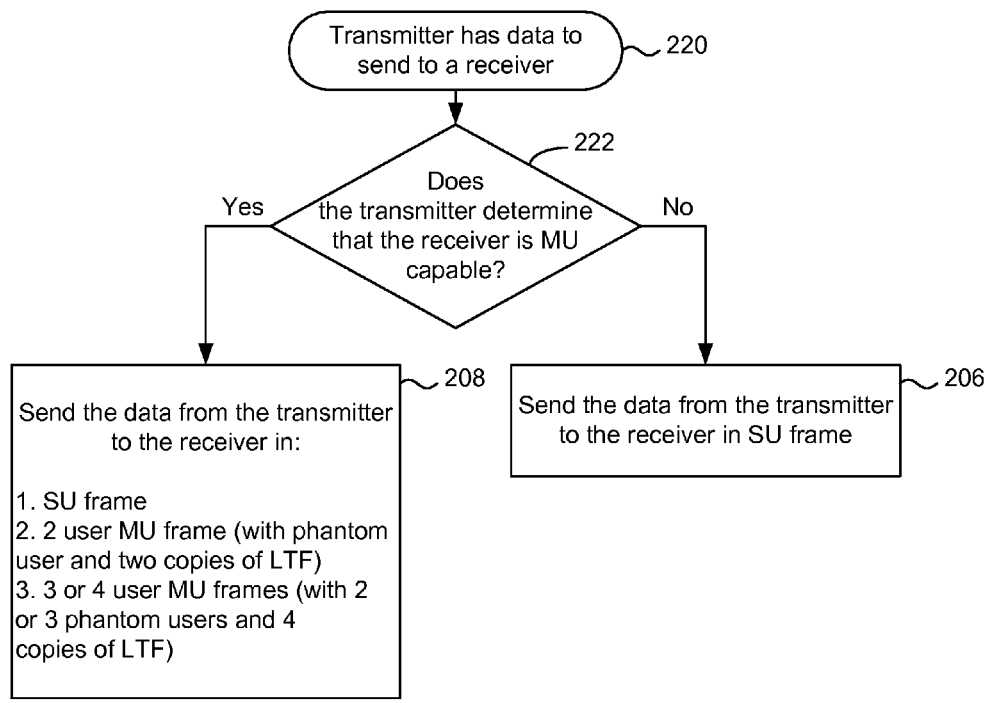
FIG. 2C is a flow diagram illustrating another embodiment of a method of transmitting a multi-user frame.

With reference to FIG. 2C an example of an embodiment of a procedure or routine for transmitting a frame is depicted. The routine is described below in the context of an 802.11ac communication using SU and MU frames according to one embodiment. However, the routine is applicable to other frame formats and communication standards.

The routine can be used when a transmitter (e.g., the AP 106) has decided to send data to a first receiver (e.g., one of the devices 102) at an operation 220. The routine includes determining, by the AP 106, whether the device 102 is MU capable (e.g., (MU-MIMO capable) at an operation 222. If the device 102 is not MU (e.g., MU-MIMO) capable, the AP 106 can send the frame as a SU frame (e.g., SU-MIMO) to device 102 in an operation 206.

If the device 102 is MU capable, the AP 106 can send the frame according to at least three options in an operation 208. According to a first option, the AP 106 can send the data with an SU frame (which will have 1 LTF (e.g., the field 124 in the frame 112)) at the operation 208. According to a second option, the AP 106 can send the data with a 2 user MU frame (with 1 phantom user, and containing 2 copies of the LTF (e.g., two copies of the field 124 in the frame 112)) in the operation 208. According to a third option, the AP 106 can 106 send the data with a 3 or 4 user MU frame (which will have 2 or 3 phantom users, and 4 copies of the LTF (e.g., a copy of each of the fields 124 and 126 or three copies of the field 124 in frame 112)) in the operation 208. Other embodiments of operation 208 can use more phantom users and more copies of the LTF. The AP 106 can select the option in the operation 208 (e.g. which frame format (SU or 2 user MU, 4 user MU, etc.) based on amount of data, MCS history, etc. The copies of the fields 124 and 126 can be sign modulated copies in one embodiment.

According to one embodiment, when a transmitter (the AP 106) has decided to send MU data to a first receiver and a second receiver (e.g., two of devices 102), the transmitter can send the frame according to at least four options. In the options below, the transmitter has confirmed that the first and second receivers are MU capable in one embodiment. According to a first option, the AP 106 can send the data with a 2 user MU frame (which will have 2 LTFs in total (e.g., the field 124 and 126 in the frame 112)). According to a second option, the AP 106 can send the data with a 3-4 user MU frame (with 1 or 2 phantom users, and containing 2 or 3 copies of the LTFs (e.g., two copies of each of the fields 124 and 126 or three copies of the field 124 in the frame 112)). According to a third option, the AP 106 can send the data with a 5 or 6 user MU frame (which will have 3 or 4 phantom users, and 5 or 6 LTFs (e.g., three copies of each of the fields 124 and 126, four copies of one of field 124 or 126 and one or two copies of the other of field 124 or 126, or five copies of the field 124 and one copy of the field 126 in frame 112)). According to a fourth option, the AP 106 can send the data with a 7 or 8 user MU frame (which will have 5 or 6 phantom users, and 7 or 8 LTFs (e.g., four copies of each of the fields 124 and 126, five copies of one of the field 124 or 126 and 2 or 3 copies of the other of the field 124 or 126, or six or seven copies of the field 124 and one copy of the field 126 in frame 112, etc.)). Other permutations of copies of LTFs or the fields 124 and 126 can be used.

In one embodiment, the frame structure can have flexibility in terms of the number of LTF fields that are included in the frame. With such flexibility, the AP 106 can dynamically make a decision, on a frame-by-frame basis, of how many LTFs to include in each individual transmission in one embodiment.

Figure 2D:
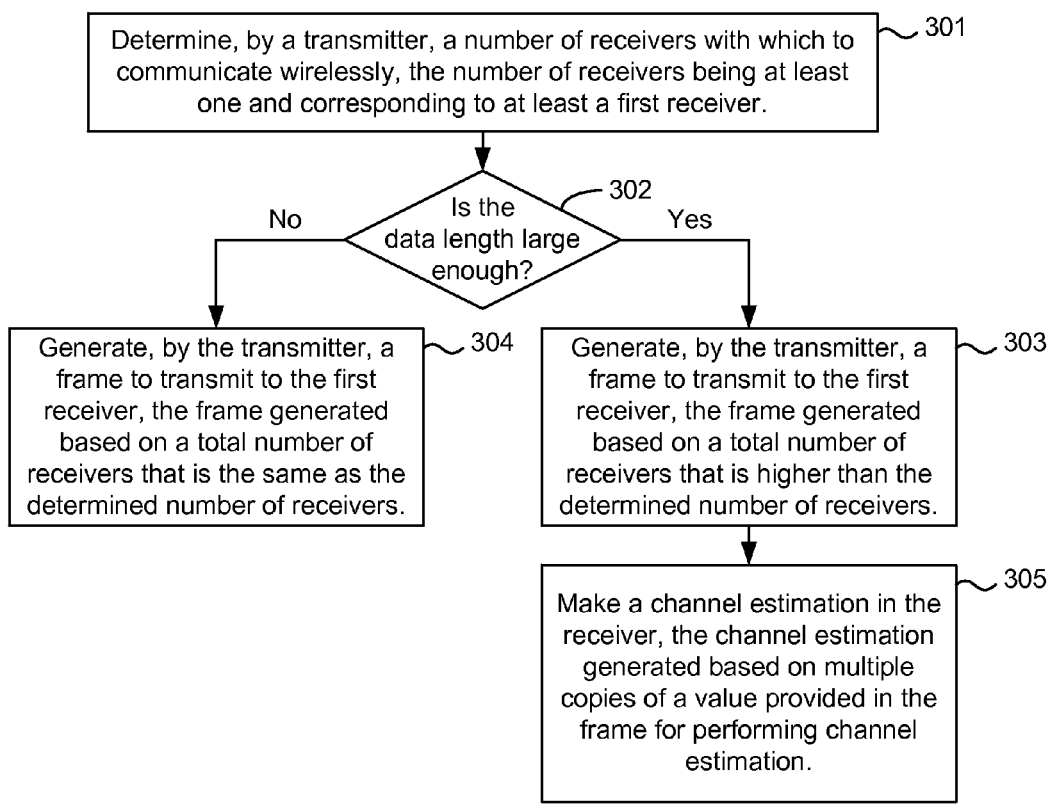
FIG. 2D is a flow diagram illustrating another embodiment of a method of transmitting a multi-user frame.

According to another embodiment and with reference to FIG. 2D, a procedure or routine can include the operations 301, 303 and 305 corresponding to respective operations 201, 203 and 205 discussed with reference to FIG. 2B. An operation 302 between the operations 301 and 303 or before the operation 301 can be utilized to determine if the amount of data being transferred justifies using the communication overhead associated with one or more copies of the field 124. If the size of the data is below a threshold, the communication of the frame 112 can be made without the use of one or more copies of the field 124 in an operation 304 in one embodiment. If the size of the data is greater than the threshold, the communication of the frame 112 is made using the operations 303 and 305. The threshold can be set using various factors including the number of wireless communication device 102 in the environment, historical channel estimates, previous MCS levels, etc. In certain embodiments, the threshold is set low so that nearly all data frames use operations 301, 303 and 305. In one embodiment, if communication between the device 102 and the AP 106 occurs at an MCS level within or at the top of an appropriate range for the capabilities of the device 102 or AP 106, the frame is communicated according to operation 304.

Figure 3:
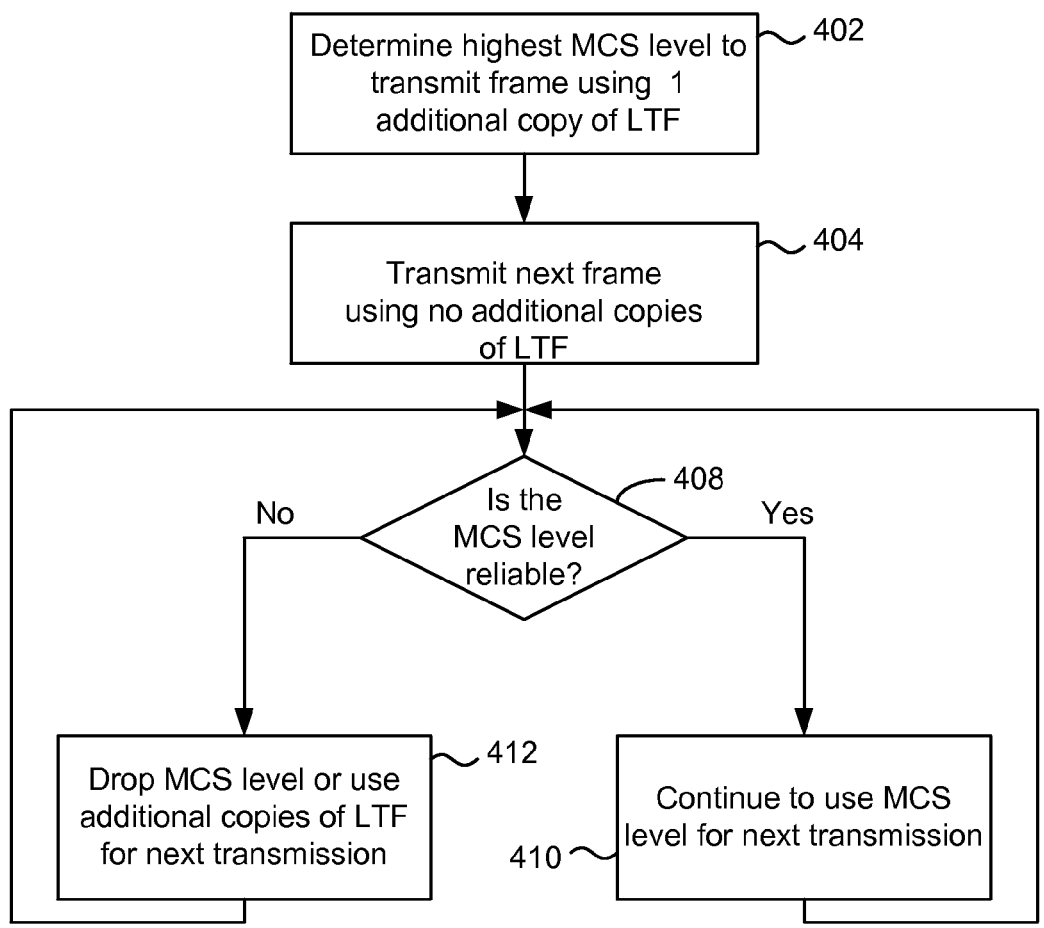
FIG. 3 is a flow diagram illustrating another embodiment of a method of transmitting multi-user frames.

With reference to FIG. 3, an embodiment of a procedure or routine for transmitting frames between the AP 106 and the wireless communication device 102 is depicted. At an operation 402, the MCS level at the top of or within an appropriate range of MCS levels can be determined by the AP 106 for statistically (or otherwise) reliably decoding the frame 112 when one additional copy of the field 124 is provided. This determination can be made by sending frames at each MCS level to estimate how reliable each MCS level is in one embodiment. A dynamic algorithm executed by the AP 106 can adjust the MCS level, based on success/failures of previous packets or frames in one embodiment. Success/failure can be determined by the access point 106 based on an acknowledge message from the device 102 that received the frame 112. The routines described with reference to FIGS. 2B, 2C, and 2D can be used for transmitting frames for operation 402 in one embodiment.

At an operation 404, another frame 112 is transmitted at the same MCS level determined in the operation 402 using no additional copies of the field 124 (that were used in operation 402). At an operation 408, the AP 106 determines if the frame 112 in operation 404 was sufficiently reliable. At an operation 410, if the MCS level is sufficiently reliable, the next frame is transmitted using the MCS level. If the MCS level is not sufficiently reliable, the next frame is transmitted using at least one additional copy of field 124 and the same MCS level in operation 412 or the next frame is transmitted at a lower MCS level in operation 412. In one embodiment, the operation 412 can consider frame length when determining whether to lower the MCS level or add a copy of the field 124. Operations 402, 404 or 408 can follow operations 412 or 410 in certain embodiments The frame generation module 222 can include hardware, or a combination of hardware and software. For example, the frame generation module 222 can include any application, program, library, script, task, service, process or any type and form of executable instructions executing on hardware of the access point. In one embodiment, the frame generation module 222 includes a set of executable instructions executing on a core or processor of the access point.

The frame generation module 222 can include circuitry designed and/or constructed to perform any of the operations and functions described herein. In some embodiments, the frame generation module 222 can control transmission of packets or frames to devices (e.g., wireless communication device 102). For example, the frame generation module 222 can determine or estimate the amount of data for transmission to each device 102, determine an MU-MIMO capable devices 102 to use a frame configured for additional users based upon size, and/or provide the MU-MIMO frame. The frame generation module 222 can use any type and form of statistical or probabilistic algorithms or decision making process to build the MU-MIMO frame in one embodiment.

In some embodiments, the frame generation module 222 includes firmware executing on the hardware of AP 106. The firmware can operate in a layer of a protocol stack of the access point (e.g., in an upper layer) in one embodiment. In certain embodiments, the frame generation module 222 operates in the Media Access Control (MAC) layer, e.g., residing between a lower layer of MAC and a higher layer of MAC or a driver layer.

The frame generation module 222 can have access to the configuration 224 of the AP 106. The configuration 224 can include information about assignment/allocation of transmission resources to one or more of the plurality of wireless communication device 102. The configuration 224 can be stored in a storage module 223 of the AP 106. The storage module 223 can include one or more interconnected storage devices, such as any embodiment of storage devices 129, 140, 133, described above in connection with FIGS. 1B and 1C. In some embodiments, the frame generation module 222 can generate the configuration, for example, by storing multi-user capabilities of each wireless communication device 102 in the environment.

The configuration 224 can include a list, table or other database structure, and can include at least one entry, record or specification for each device. The configuration 224 can include a file or a collection of records, stored/maintained in the storage module 223 (e.g., memory). A transmitter or transmit chain of the AP 106 can access or read a portion of the configuration 224, to process an amount of information for transmission to a corresponding device 102. For example, the transmitter or transmit chain can use the configuration for a certain device, to allocate resources for a transmission to that device in one embodiment.

Operations 202, 203, and 205 as well as the operations in FIGS. 2B and 3 can be performed by wireless devices (e.g., wireless communication device 102) in one embodiment. Wireless communication device 102 can communicate with each other, another wireless device, or AP 106 using frame 112 adjusted for performance as discussed herein in one embodiment. For example, wireless communication device 102 capable of multi-user communication can include frame generation module 222, storage module 223, and configuration 224 discussed in FIG. 2A to effect communication using copies of the field 124 as described herein according to one embodiment.

In certain embodiments, copies of other training fields can be utilized. As discussed above, the copies of the fields 124 and 126 can be a sign modulated copies in one embodiment. In one embodiment, the first field 124 is non-negated, the next copy is negative, the second copy is non-negated, and the third copy is non-negated. Other patterns are possible.

Although the disclosure can reference one or more "users", such "users" can refer to user-associated devices or stations (STAs), for example, consistent with the terms "user" and "multi-user" typically used in the context of a MU-MIMO environment.

Although examples of communications systems described above can include STAs and APs operating according to an 802.11 standard, it should be understood that embodiments of the systems and methods described can operate according to other standards and use wireless communications devices other than devices configured as STAs and APs. For example, multiple user communications capable interfaces associated with cellular networks, satellite communications, vehicle communication networks, and other non-802.11 wireless networks can utilize the systems and methods described herein to achieve improved channel estimation and/or SNR without departing from the scope of the systems and methods described herein.

It should be noted that certain passages of this disclosure can reference terms such as "first" and "second" in connection with devices, number of bits, transmission durations, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method of channel estimation, the method comprising:
   determining, by a transmitter, a number of receivers with which to communicate a frame wirelessly, the number of receivers being at least one and corresponding to at least a first receiver; and
   generating, by the transmitter, the frame to transmit to the first receiver, the frame being generated based on a total number of receivers that is higher than the determined number of receivers, wherein the frame comprises at least one copy of at least one first-type training field, wherein a number of the at least one copy of the at least one first-type training field plus a number of the at least one first-type training field is equal to the total number of receivers that is higher than the determined number of receivers.

2. The method of claim 1, further comprising determining that the first receiver supports multi-user multiple-input and multiple-output (MU-MIMO) frames.

3. The method of claim 1, wherein the frame is a multi-user multiple-input and multiple-output (MU-MIMO) frame.

4. The method of claim 1, wherein the first-type training field and the at least one copy are used by the receiver to perform noise averaging.

5. The method of claim 1, wherein the total number of receivers is at least twice the determined number of receivers.

6. The method of claim 1, wherein the first-type frame training field comprise a very high throughput long training field (VHT-LTF) for performing channel estimation, wherein the at least one copy is sign modulated.

7. The method of claim 1, further comprising identifying at least one receiver from the total number of receivers that does not physically exist, and performing transmission steering without assigning one or more of: transmission power and data, to the at least one identified receiver that does not physically exist.

8. The method of claim 7, further comprising generating a steering matrix for the transmitter with appropriately zeroed entries corresponding to the at least one identified receiver.

9. The method of claim 1, further comprising determining a channel estimation response in the receiver, the channel estimation response generated based on multiple copies of a value provided in the frame for performing channel estimation.

10. The method of claim 1, further comprising receiving one or more of: location and time of flight feedback from the receiver determined based on the frame.

11. A wireless beamformer device, comprising:
a processor configured to provide a frame to transmit to at least a first wireless beamformee device, the processor configured to provide the frame based on a total number of beamformee devices that is higher than a total number of intended recipients, wherein the frame comprises at least one copy of at least one first-type training field, wherein a number of the at least one copy of the at least one first-type training field plus a number of the at least one first-type training field is equal to the total number of beamformee devices that is higher than the total number of intended recipients.

12. The wireless beamformer device of claim 11, wherein the frame comprises a multi-user multiple-input and multiple-output (MU-MIMO) frame and wherein the processor has data indicating that the first wireless beamformee device supports multiple unit beamforming.

13. The wireless beamformer device of claim 11, wherein the first-type training field is used to perform noise averaging.

14. The wireless beamformer device of claim 13, wherein the wireless beamformer device is an 802.11 standard device and the at least one copy comprises at least one sign modulated copy.

15. The wireless beamformer device of claim 11, wherein the frame comprises the at least on copy is a very high throughput long training field (VHT-LTF) field for performing channel estimation.

16. The wireless beamformer device of claim 11, wherein the processor is configured to determine a size of the frame and to provide the frame generated based on the total number of beamformee devices that is higher than the total number intended recipients, responsive to determining that the size is in a first relationship to a threshold.

17. The wireless beamformer device of claim 16, wherein the processor is configured to provide the frame generated based on the total number of beamformee devices that is the same as the total number of intended recipients, responsive to determining that the size is in a second relationship to the threshold.

18. A method of wireless communication, the method comprising:
determining, by a beamformer, a number of beamformees supporting multiple unit beamforming and intended by the beamformer to receive a frame; and
providing, by the beamformer, the frame to transmit based on a total number of beamformees that is higher than the determined number of the beamformees intended by the beamformer to receive the frame, the frame including a number of fields for multiple unit beamforming training, the number of fields for multiple unit beamforming training being more than the determined number of beamformees intended by the beamformer to receive the frame, wherein the frame comprises at least one copy of at least one first-type training field, wherein a number of the at least one copy of the at least one first-type training field plus a number of the at least one first-type training field is equal to the total number of the beamformees that is higher than the number of beamformees intended by the beamformer to receive the frame.

19. The method of claim 18, further comprising receiving a channel estimation response from a beamformee, the channel estimation response generated based on at least one copy of a field in the number of fields, the total number of fields including the at least one copy, the at least one copy and the field being used for performing channel estimation.

20. The method of claim 18, wherein the beamformer is an access point for a wireless local area network.

* * * * *